(No Model.) 2 Sheets—Sheet 1.
N. R. STREETER.
HANDLE.
No. 425,352. Patented Apr. 8, 1890.
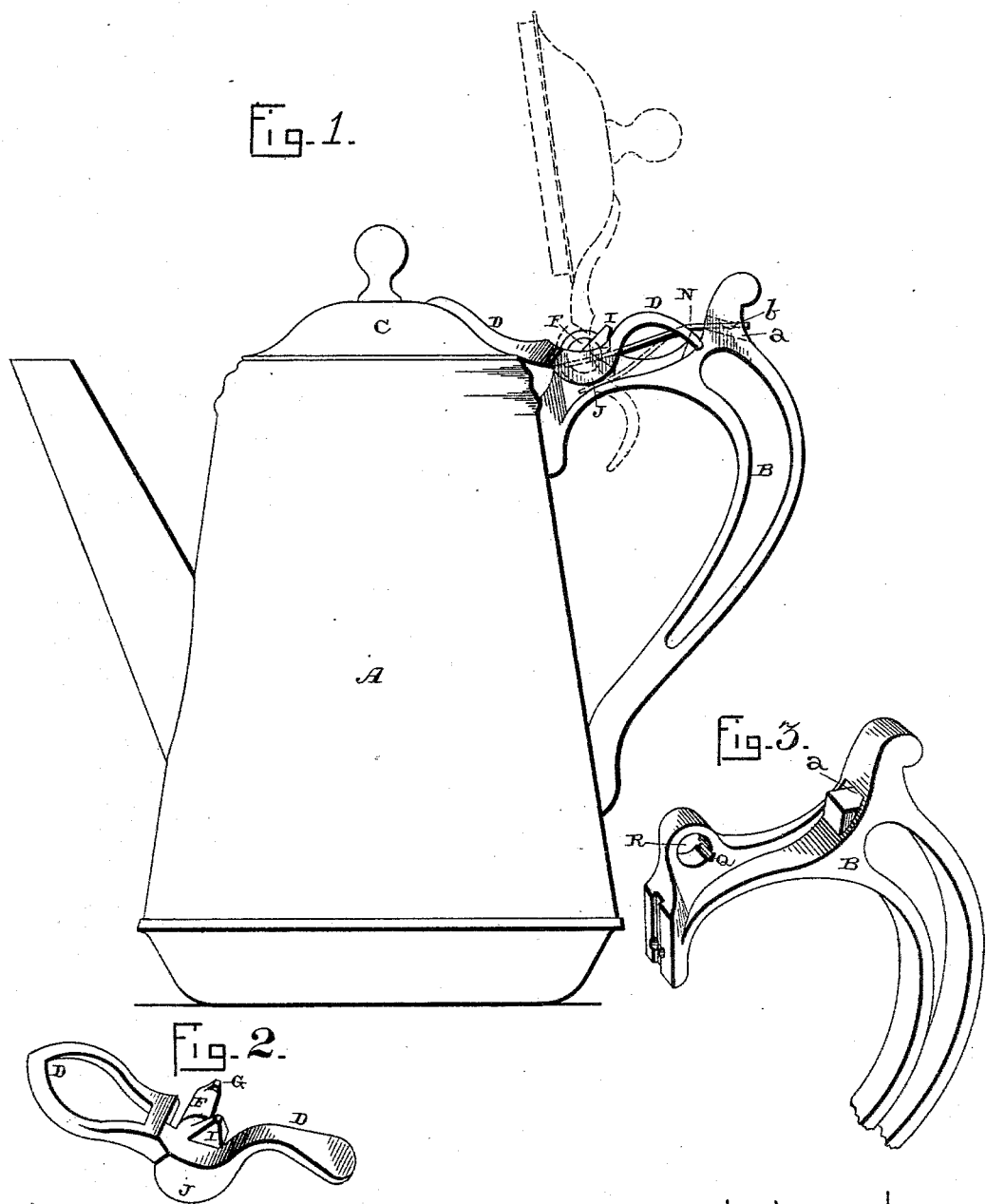
Witnesses:
E. P. Ellis,
L. J. Magie.
Inventor:
N. R. Streeter,
per F. A. Lehmann,
Atty (No Model.) 2 Sheets—Sheet 2.
N. R. STREETER.
HANDLE.
No. 425,352. Patented Apr. 8, 1890.
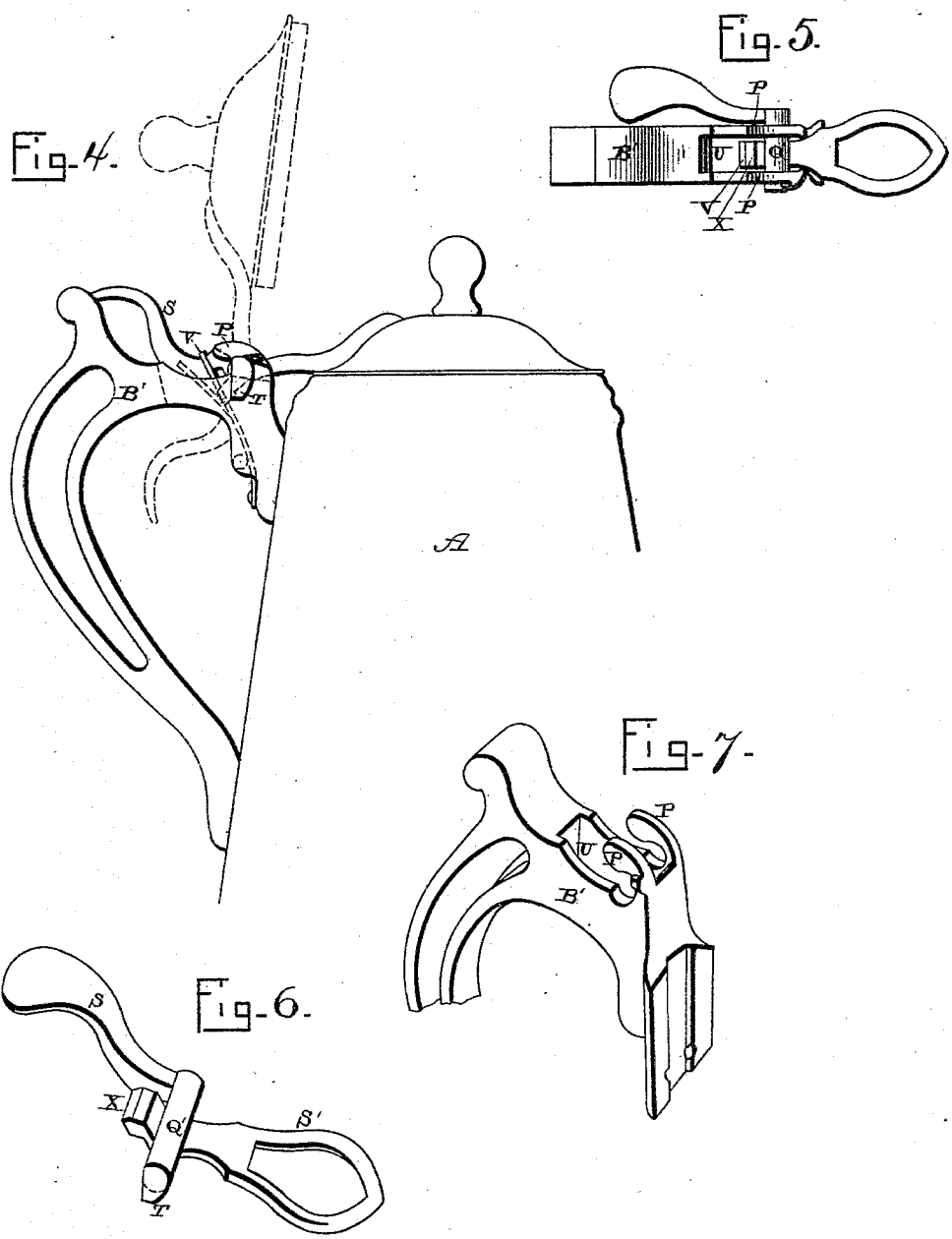

UNITED STATES PATENT OFFICE.

NELSON R. STREETER, OF GROTON, ASSIGNOR TO THE LALANCE & GROSJEAN MANUFACTURING COMPANY, OF NEW YORK, N. Y.

HANDLE.

SPECIFICATION forming part of Letters Patent No. 425,352, dated April 8, 1890.

Application filed October 30, 1889. Serial No. 328,669. (No model.)

*To all whom it may concern:*

Be it known that I, NELSON R. STREETER, of Groton, in the county of Tompkins and State of New York, have invented certain new and useful Improvements in Handles; and I do hereby declare the following to be a full, clear, and exact description of the invention, such as will enable others skilled in the art to which it pertains to make and use it, reference being had to the accompanying drawings, which form part of this specification.

My invention relates to an improvement in handles for tea and coffee pots; and it consists in the combination and arrangement of parts, which will be more fully described hereinafter, and particularly pointed out in the claims.

The object of my invention is to provide a tea or coffee pot, or a receptacle of any kind which is provided with a cover, with a cover which is not only spring-actuated, but which can be readily detached from and returned to position whenever desired, so that the receptacle can be freely cleaned at any time.

Figure 1 is a side elevation of a receptacle which embodies my invention, the cover being shown as closed in solid lines and open in dotted lines. Fig. 2 is a perspective of the arm or lever attached to the cover. Fig. 3 is a perspective of the upper portion of the handle of the receptacle alone. Figs. 4, 5, 6, and 7 show a slight modification.

A represents a receptacle of any kind, which is provided with a handle B, which is secured thereto in the usual manner, and C the cover. Secured to the cover is the operating arm or lever D, which may either be cast, struck up, or formed in any manner desired, and then secured to the cover at its inner end. Upon the inner edge of this arm or lever is formed a pivot, bearing, or journal F, which is preferably made slightly conical in shape, and upon which at its outer end is formed the stop G. This pivot, journal, or bearing F is made just long enough to project through the opening R, formed in the handle B, made to receive it, and to allow the stop G to catch against the outer edge of the handle, for the purpose of preventing the arm or lever and cover from becoming accidentally detached. In order to attach the cover to the handle, the cover must be turned backward until the stop G on the bearing or journal F is just opposite the groove Q, and then the bearing F is pushed laterally through the opening until the stop comes through upon the other side. In opening the cover the stop G is never turned backward sufficiently far to come opposite to the groove unless it is desired to remove the cover to allow the receptacle to be cleaned or for any other purpose.

Upon the arm or lever at the inner end of the journal or bearing, and a little to the rear of it, is formed a projection I, and the arm or lever underneath this projection is slightly scooped or hollowed out, so as to form a recess, into which the end of the spring is made to catch. The end of this spring being held between the vertical flange J, formed upon the outer lower edge of the arm or lever, and the inner end of the journal or bearing, it can have no lateral movement whatever, and hence is not liable to become displaced. The projection I upon the top of the handle or lever is not brought into play until the handle is turned backward, and then it forms a stop by striking against the top of the spring, to prevent the cover from being turned back any farther. This stop by striking against the spring prevents the stop G from being moved back far enough to come opposite to the grooves, and hence the cover cannot be displaced unless it is intentionally forced on back into or past a vertical position. The inner end of the arm or lever is preferably shaped as shown, and projects along just above the top of handle B, so that in grasping the handle the thumb will rest upon the free curved end of the arm or lever, so that a slight pressure will cause the cover to rise. After the cover has been opened back to its fullest extent it will be held in a raised position by frictional contact against the spring, and then a slight pressure on the under side of the arm or lever with one of the fingers is sufficient to return it to position. By this construction the cover can be opened and closed at the will of the operator by holding the tea or coffee pot in the hand, and without having to set it down and apply one of the hands to the cover for the purpose of opening it.

Through the extreme upper and outer portion of the handle B is formed a horizontal opening $a$, in which there is a depending projection $b$, (shown in dotted lines in Fig. 1,) which passes through an opening in the outer end of the spring N. The pressure of the inner end of the spring against the handle and this projection or hanger $b$ serves to hold the spring firmly in position. After the handle has been removed the spring can be made to drop out.

In Figs. 4, 5, 6, and 7 is shown a slightly-different construction. Instead of an opening R being made through the handle, in this case two backwardly-turned hooks or keepers P are used, and the journal or bearing Q' of the operating arm or lever S is made to catch under these hooks, which form a suitable pivotal bearing or support for the arm or lever. The stop T at the inner end of the journal or bearing catches against the outer edge of the handle, so as to prevent the arm or lever from becoming displaced.

Through the handle B' is formed a vertical slot or opening U, up through which the upper end of the spring V passes and bears against a projection X upon the arm or lever, for the purpose of holding the cover in either an open or a closed position. In this case the spring extends vertically instead of horizontally; but, with the exception of a slight difference in the construction of the arms or levers, the operation of the parts is the same in both instances.

Having thus described my invention, I claim—

1. The combination, with a receptacle-handle having a bearing formed thereon near its upper inner end, of an operating-lever provided at or near its center with a journal, which rests in the said bearing, a rearwardly-extending projection, which engages the spring and forms a stop, and a spring which has one end secured to the handle and the opposite and free end to engage the center of the lever, and against which the stop strikes when the lever is turned to substantially a vertical position, the cover secured to the inner end of the lever, the outer end of the lever extending rearward and forming a handle, substantially as described.

2. The combination, with a receptacle-handle having projections in which is formed a bearing, and a cut-away portion for the movement of the free end of the spring, of the operating-lever having at or near its center a journal which rests in the said bearing, and a spring which has one end secured to the handle and its opposite free end extending within the cut-away portion and engaging substantially the center of the lever, whereby the spring is allowed a movement at its free end, substantially as shown.

3. The combination, with a receptacle-handle provided with a bearing near its upper inner end, the cover, an operating-lever having its inner end secured to the cover, its outer end formed into a handle, and a laterally-extending journal at or near its center, which projects beyond the adjacent side of the lever, rests within the said bearing, and provided at its outer end with a projection, and a downwardly-projecting flange formed upon the lever opposite the journal, so that a space is formed between the said bearing and the flange, and the spring having one end secured to the handle and its opposite end extending between the bearing and the flange and engaging the said lever, whereby the lever is held against lateral movement, substantially as specified.

4. The combination, with a receptacle-handle provided with a closed circular bearing provided with a longitudinal slot in its rear inner surface, of an operating-lever having a laterally-projecting journal at or near its center, provided with a projection at its outer end adapted to slide in the said slot, and a stop adjacent to the bearing back of the said projection, and the spring having one end secured to the handle and its opposite free end engaging the lever under the stop, whereby the stop engages the spring before the projection on the journal reaches the slot in the bearing, for the purpose described.

In testimony whereof I affix my signature in presence of two witnesses.

NELSON R. STREETER.

Witnesses:
HERMAN S. HOPKINS,
DANA RHODES.